United States Patent [19]

Narain

[11] Patent Number: 5,574,937

[45] Date of Patent: Nov. 12, 1996

[54] METHOD AND APPARATUS FOR IMPROVING INSTRUCTION TRACING OPERATIONS IN A COMPUTER SYSTEM

[75] Inventor: Bikas Narain, Gilbert, Ariz.

[73] Assignee: Intel Corporation, Santa Clara, Calif.

[21] Appl. No.: 380,026

[22] Filed: Jan. 30, 1995

[51] Int. Cl.[6] .................................................. G06F 9/26
[52] U.S. Cl. ........................ 395/800; 364/DIG. 1; 364/267; 364/262.4; 364/261.3; 395/376
[58] Field of Search ...................................... 395/375, 800

[56] References Cited

U.S. PATENT DOCUMENTS

| 5,142,634 | 8/1992  | Fite     | 395/375  |
|-----------|---------|----------|----------|
| 5,278,811 | 12/1993 | Borg     | 395/700  |
| 5,321,828 | 6/1994  | Phillips | 395/500  |
| 5,359,608 | 10/1994 | Belz     | 371/16.5 |
| 5,404,559 | 4/1995  | Bonella  | 395/800  |
| 5,475,829 | 12/1995 | Thome    | 395/479  |
| 5,485,587 | 1/1996  | Matsuo   | 395/375  |

*Primary Examiner*—Eric Coleman
*Attorney, Agent, or Firm*—Blakely, Sokoloff, Taylor & Zafman

[57] ABSTRACT

A computer processor which provides special bus cycles during tracing operations one of which cycles provides the address of a command on the bus which initiates a branch operation while the other provides both the address of a command which initiates a branch operation and the address of the branch taken.

6 Claims, 7 Drawing Sheets

FIG_1

FIG_2

FIG_3

| M/IO# | D/C# | W/R# | CACHE# | BUS CYCLE TYPE |
|---|---|---|---|---|
| 0 | 0 | 0 | 1 | INTERRUPT ACKNOWLEDGE |
| 0 | 0 | 1 | 1 | SPECIAL CYCLE |
| 0 | 1 | 0 | 1 | I/O READ |
| 0 | 1 | 1 | 1 | I/O WRITE |
| 1 | 0 | 0 | 1 | CODE (INSTRUCTION) READ |
| 1 | 0 | 0 | 0 | CODE READ (BURST LINE FILL)* |
| 1 | 0 | 1 | X | RESERVED |
| 1 | 1 | 0 | 1 | MEMORY DATA READ |
| 1 | 1 | 0 | 0 | MEMORY DATA READ (BURST LINE FILL)* |
| 1 | 1 | 1 | 1 | MEMORY DATA WRITE |
| 1 | 1 | 1 | 0 | MEMORY WRITEBACK (BURST CYCLE) |

* INDICATES BURST CYCLE UNLESS KEN# IS SAMPLED INACTIVE

FIG_4

| SPECIAL CYCLE TYPE | BE5# | BE4# | BE3# | BE2# | BE1# | BE0# |
|---|---|---|---|---|---|---|
| SHUTDOWN | 1 | 1 | 1 | 1 | 1 | 0 |
| FLUSH | 1 | 1 | 1 | 1 | 0 | 1 |
| HALT | 1 | 1 | 1 | 0 | 1 | 1 |
| WRITE BACK | 1 | 1 | 0 | 1 | 1 | 1 |
| FLUSH ACKNOWLEDGE | 1 | 0 | 1 | 1 | 1 | 1 |
| BRANCH TRACE MESSAGE | 0 | 1 | 1 | 1 | 1 | 1 |

FIG_5

| IU | IV | IBT | |
|---|---|---|---|
| 0 | 0 | 0 | NO INSTRUCTION COMPLETED. |
| 0 | 0 | 1 | DOES NOT OCCUR. |
| 0 | 1 | 0 | DOES NOT OCCUR. |
| 0 | 1 | 1 | DOES NOT OCCUR. |
| 1 | 0 | 0 | NON-BRANCH INSTRUCTION COMPLETED IN THE U PIPELINE. |
| 1 | 0 | 1 | A BRANCH WAS TAKEN BY AN INSTRUCTION IN THE U PIPELINE |
| 1 | 1 | 0 | INSTRUCTIONS COMPLETED IN THE U AND IN THE V PIPELINES. NEITHER WAS A TAKEN BRANCH. |
| 1 | 1 | 1 | INSTRUCTIONS COMPLETED IN BOTH PIPELINES AND THE INSTRUCTION IN THE V PIPELINE WAS A TAKEN BRANCH. |

FIG_6

FIG_7C

5,574,937

METHOD AND APPARATUS FOR IMPROVING INSTRUCTION TRACING OPERATIONS IN A COMPUTER SYSTEM

BACKGROUND OF THE INVENTION

1. Field of the Invention

This invention relates to computer systems and, more particularly, to apparatus and a method for improving instruction tracing operations in a computer system.

2. History of the Prior Art

In the continuing effort to improve affordable computers, newer components are continually being designed. This is especially true of the processors which offer the easiest way to improve operational speed. Among other improvements related to processors, clock speeds have increased dramatically, buses and processors have been decoupled to allow further increases in speed, and superscaler designs have become a reality in personal computer design.

Although each of these improvements has increased the operational speed of the computer, each has also increased the difficulty of programming. This is especially important in superscaler designs where commands are being processed by a number of different processing channels at one time. In the Pentium® processor manufactured by Intel Corporation of Santa Clara, Calif., for example, two integer channels and a floating point channel may be operating at once. In the design of many such superscaler processors, the commands which may be processed by one of the channels depend on the commands being processed by the other of the channels. In order for a programmer to provide applications which make best use of the facilities of these processors, it is necessary that the programmer be able to ascertain the sequences of operations accurately in order to understand how disruptions in the flow of operations may be removed.

The facilities provided by the Pentium® processor to the programmer for this purpose are somewhat primitive. The Pentium® processor provides three external pins (labeled IU, IV, and IBT) especially for tracing branching instructions. The IU pin provides a signal when an operation is completed in the U channel, the primary one of the two integer channels; while the IV pin provides a signal when an operation is completed in the V channel, the secondary one of the two integer channels. If a branch trace message special bus cycle is set, the IBT pin is driven active when a branch is taken; and, at the time the branch is taken, the target address of the branch is provided on the address bus and a number of branch trace lines. Since when an operation is taking place in a particular channel of the processor the state of the signal furnished on the IU or IV pin related to that channel changes, a count may be detected and utilized to determine the number of commands which occur between branches taken in a particular software operation. Thus, the signals on these three pins together indicate that a branch is being taken, signal that a target address is being provided, and allow a count to be made of the number of commands which have been processed by the channel.

By using the signals available on these pins, a programmer tracing the flow of commands can determine when branches are taken, which commands cause a branch, and to which addresses they are directed. Since the signals on the IU and IV pins provide only a count, a programmer must determine which commands are those which result in branches being taken, a tedious process. However, the count does allow a step-by-step process through which this may be determined. Using these bits of information helps a person program more efficiently. However, this arrangement requires that three external pins be made available on the microprocessor, a very large number of pins for the information which results.

Recently, Intel Corporation has provided new hardware and software debugging tools especially designed for use by one programming the Pentium® processor. These include an "In-Circuit Emulator" (ICE) which allows execution tracing, bus cycle tracing, trace qualification to control breakpoints and trace buffer contents, and trace filtering to control the events provided to the programmer. It is necessary to provide signals which may be utilized to implement the operation of this circuitry. In accomplishing this, it is desirable to improve the information provided to a programmer by providing improved tracing apparatus while eliminating a number of externals pins on the processor.

SUMMARY OF THE INVENTION

It is, therefore, an object of the present invention to provide apparatus and a method for improving the ability of a programmer to trace operations in a computer system while reducing the external pin count.

These and other objects of the present invention are realized in a computer processor which provides special bus cycles during tracing operations one of which cycles provides the address of a command on the bus which initiates a branch operation while the other provides both the address of a command which initiates a branch operation and the address of the branch taken.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

The present invention is especially useful in a personal computer system utilizing a microprocessor such as the Intel Pentium® processor and having a local bus architecture such as the personal computer interface (PCI) bus designed and manufactured by Intel Corporation or the VESA local bus. Such systems provide a wider bus, typically thirty-two or sixty-four bits, which is more closely associated with the central processing unit of the system and consequently is able to transfer data at a more rapid rate than earlier buses.

Figure 1:
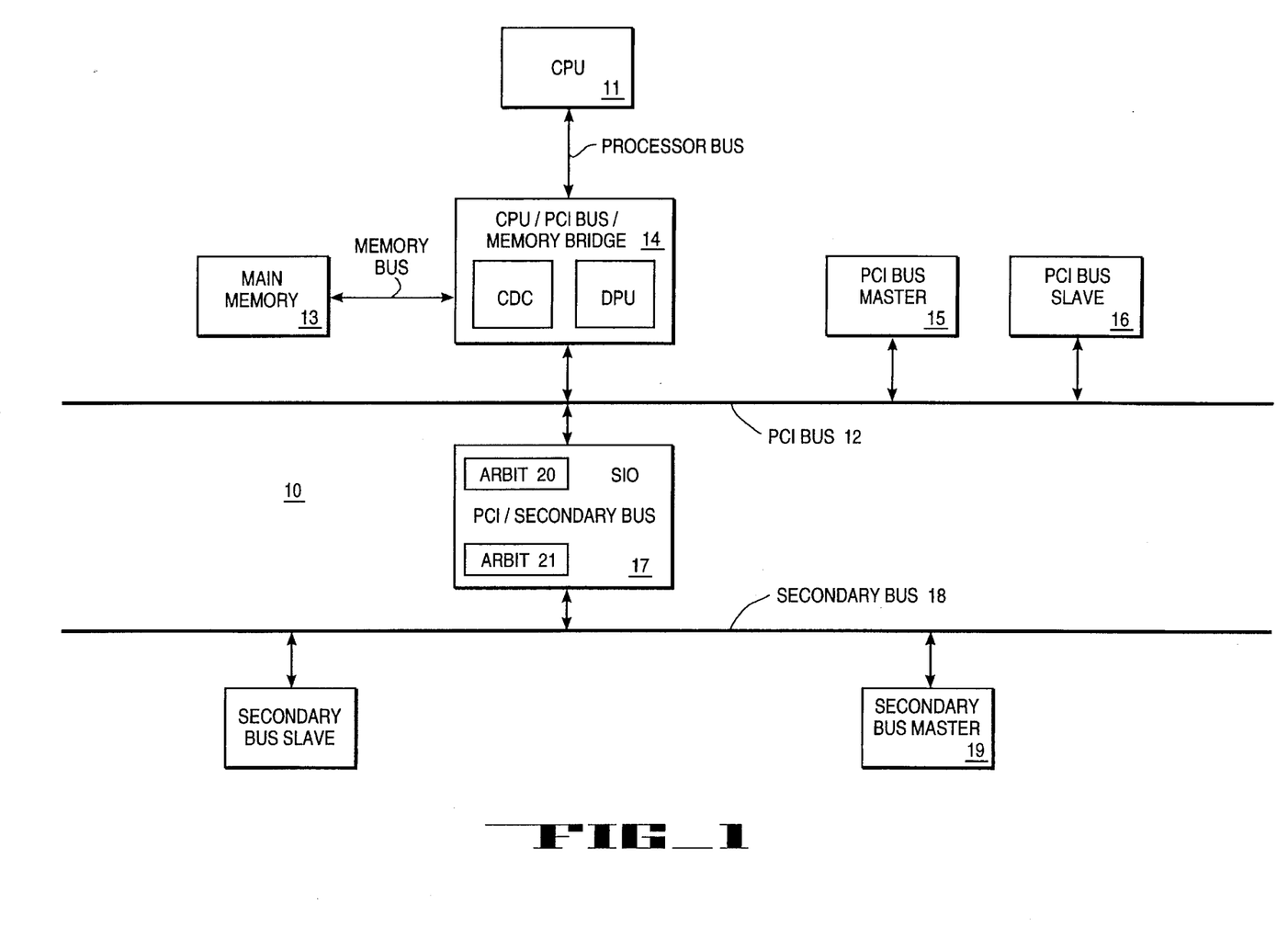
FIG. 1 is a block diagram of a computer system which may utilize the present invention.

FIG. 1 illustrates a computer system 10 designed with a PCI bus architecture. The system 10 includes a central processor 11 such as an Intel Pentium® microprocessor which carries out the various instructions provided to the computer 10 for its operations. The central processor 11 is joined to a bus 12 adapted to carry information to various components of the system 10. The bus 12 is designed as a PCI bus in order to allow the transfer of data to and from the central processor 11 at a rate faster than is possible utilizing the typical ISA or EISA buses used by the prior art. The processor 11 is joined to the bus 12 by a bridge circuit 14 which is adapted to provide various functions necessary to the transfer. Also joined to the PCI bus 12 by the bridge circuit 14 is main memory 13 which is typically constructed of dynamic random access memory arranged in a manner well known to those skilled in the prior art to store information during a period in which power is provided to the system 10. The particular bridge circuit 14 is physically constructed to include both a cache and dram controller (CDC) chip and a data path unit (DPU) chip each of which is manufactured by Intel Corporation of Santa Clara, Calif., although other bridge circuits designed in accordance with the PCI specification would function as well. In addition to various functions such as cache control and data synchronization, the bridge circuit 14 includes circuitry for controlling and accomplishing the transfer of data among the CPU 11, main memory 13, and the PCI bus 12.

The PCI bus 12 provides access to components associated therewith such as a PCI bus slave circuit 15 which may be a video output card which includes a frame buffer adapted to store video signals to be transferred to an output device such as a monitor for display. A PCI bus master circuit 16 may also be connected to the PCI bus 12. The main properties of a PCI bus master are that it includes a bus controller which functions at some internal clock rate and that it may initiate and control operations on the PCI bus 12.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus or a EISA bus either of which operates at a slower data transfer rate than the PCI bus 12. A specific PCI to ISA bus bridge circuit 17 is a part of an integrated circuit chip referred to as a "system input/output" (SIO) circuit manufactured by Intel Corporation; other bridge circuits designed in accordance with the PCI specification would function as well. Such a bridge circuit 17 includes circuitry for providing the interface between the PCI bus 12 and the secondary bus 18 which allows data to be transferred therebetween. The bridge circuit 17 provides circuitry which allows it to operate as an intercoupling bus master or as a bus slave on the PCI bus 12. The ability of the bridge circuit 17 to act as a PCI bus master allows a bus master circuit 19 positioned on the secondary bus 18 (for example, a local area network circuitry) to gain access to the PCI bus 12 and thence to the main memory.

Figure 2:
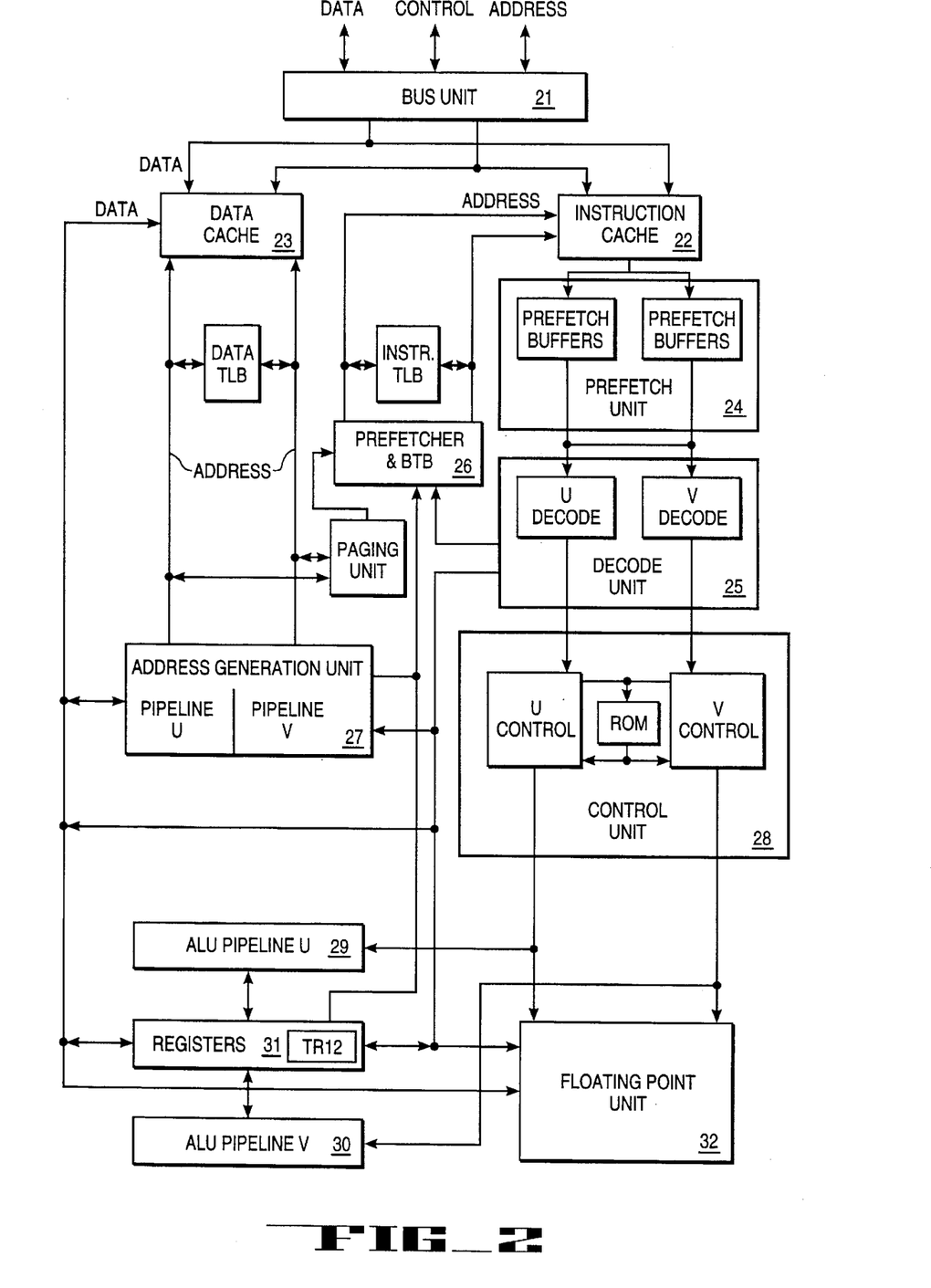
FIG. 2 is a block diagram of a particular microprocessor which may be utilized in the system of FIG. 1.

FIG. 2 is a functional block diagram of a Pentium® microprocessor 20. As may be seen, the processor 20 includes a bus unit 21 which provides an interface between the processor and the remainder of the system 10. Addresses and data are provided from the bus unit 21 to an instruction cache 22 and a data cache 23, each of which is eight Kbytes in size in one embodiment. The instruction cache stores copies of the most frequently used instructions and provides those instructions for use by two separate integer execution units U and V and a floating point unit. The data cache stores copies of the most frequently used data requested by the two integer units and the floating point unit and provides data for all three of these execution units.

The use of dual instruction pipelines providing parallel paths allows two instructions to be decoded and executed together. Each path includes a prefetch unit 24 with a set of prefetch buffers which transfer the instructions to the decode unit 25. A prefetcher 26 requests instructions from the instruction cache 22 for the prefetch buffers. Prefetches occur sequentially until a branch instruction is fetched. During sequential operations, a first of a pair of sequential instructions is sent from the prefetch unit 24 to the U pipeline decoder and a second of the pair is sent from the prefetch unit to the V pipeline decoder. In the decode unit 25, the instructions are partially decoded to determine if they can be processed together. For example, if one instruction is dependent on the result provided by the other instruction, the two instructions may not be processed together.

A branch prediction buffer which is a part of the prefetcher 26 checks each instruction to determine whether a branch is likely to occur following an instruction based on the history of that instruction. If a branch is likely to occur, the branch prediction buffer causes the address of the predicted branch (the target address) to be sent to the instruction cache 22. An address generation unit 27 which includes two address generators form the address specified by the instructions in the two pipelines. If the instruction is in the cache, it is placed in the prefetch buffer of the pipeline not processing the instruction causing the branch so that no delay is incurred if a branch is taken. If the branch is not taken, both pipelines are flushed so that instructions may continue to be processed sequentially.

The control unit 28 includes control circuitry for each pipeline and comprises a microcode sequencer and a microcode control read only memory (ROM). The control unit interprets the instruction words and microcode entry points furnished by the decode unit and controls the pipelines.

The Pentium® processor uses two separate arithmetic and logic units (ALUs) 29 and 30 to execute the instructions in the two pipelines under control of the two separate control units. The two ALUs share the same set of registers 31. Among those registers is a test register referred to as TR12 which is used among other things to store data indicating special bus sequences which are to be run by the processor 20 in order to trace branches. A particular bit in this register TR12 enables or disables branch tracing cycles.

The floating pointing unit 32 shares the first steps of the pipeline with the integer units and adds additional steps not pertinent to the present invention under control of the control unit 28 after the decode unit operations for each of the two channels.

Figure 3:
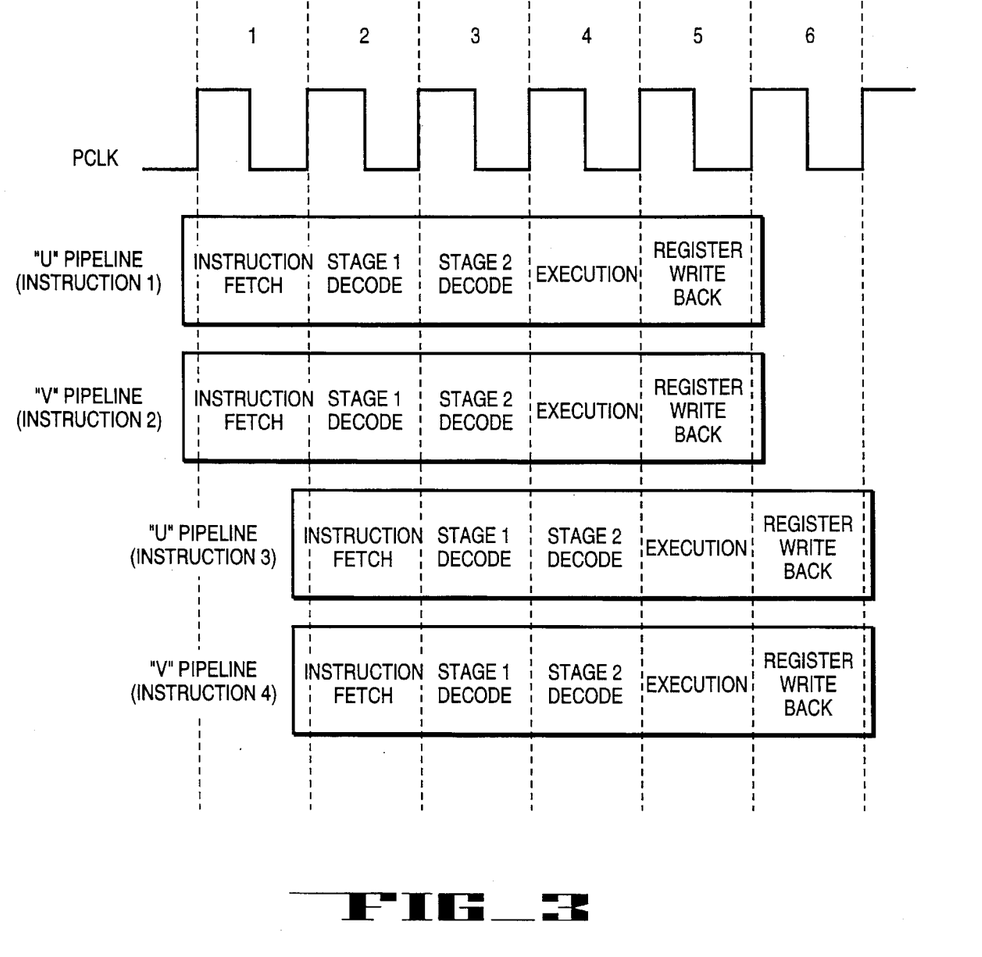
FIG. 3 is a diagram illustrating the execution pipeline of the Pentium® processor.

FIG. 3 illustrates the execution pipeline of the two integer units. As may be seen, the pipeline has five individual stages when processing proceeds through either of the integer units U and V. These include the instruction fetch, decode 1, decode 2, execution, and write back. As may be seen, the pipeline allows a pair of instructions to be executed during each clock cycle of the processor when processing at maximum speed.

In the original Pentium® processor, a special cycle on the bus called a branch trace cycle can be generated when the bit 1 in the TR12 register is set to a one value. When a branch is taken in one of the two channels U or V, a branch trace special cycle is generated and the IBT pin on the processor asserts that a branch has been taken. The instruction branch taken is asserted for one clock cycle. During the next cycle of the bus 12, the linear address of the branch target appears on the address pins A31:A3. Additionally, branch tracelines BT3:BT0 are driven during these special branch trace cycles. The lines BT2:BT0 provide address bits A2:A0 of the linear address for the branch target while line BT3 indicates the default size of the operand (either 16 or 32 bits). A signal on the IU output pin indicates that the instruction in the U channel has completed. A signal on the IV output pin indicates that the instruction in the V channel has completed. These two signals may be used to count the number of instructions between branches taken.

Figure 4:
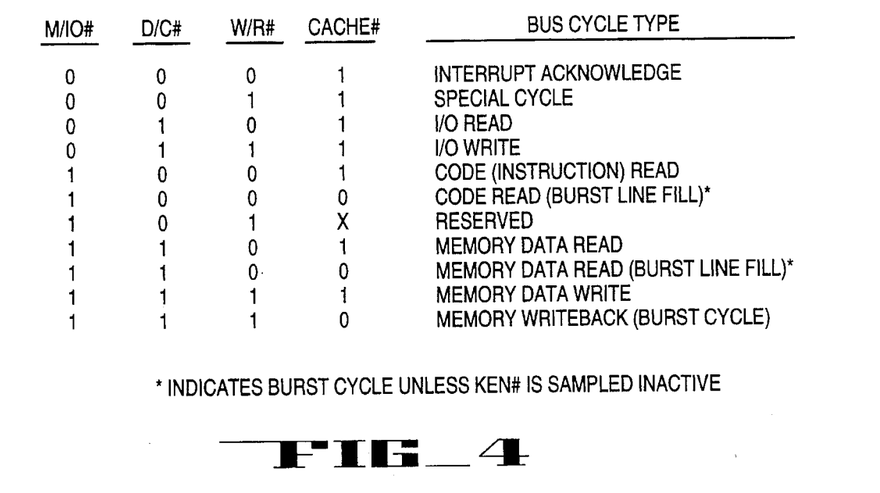
FIG. 4 is a table listing the values of signals used to define bus cycles in the Pentium® processor.
Figure 5:
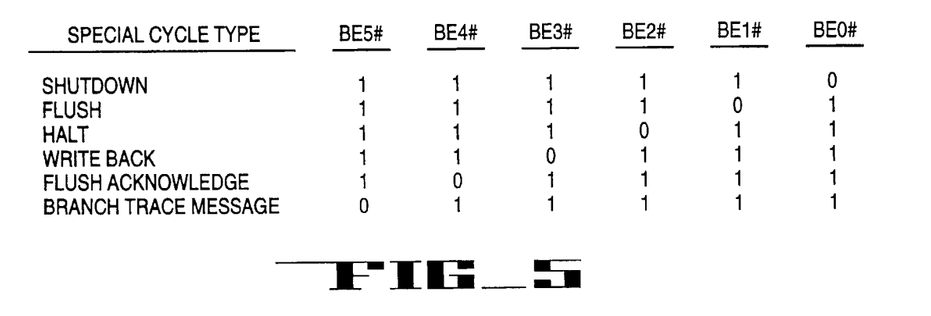
FIG. 5 is a table listing the values of additional signals used to define bus cycles in the Pentium® processor.

In order to provide a special cycle in the original Pentium processor, the output values of the bus cycle pins must be set. FIG. 4 provides a list of the values on the particular output pins which provide different bus cycles in the original Pentium® processor. Among the control signals provided by the bus unit of the Pentium® processor as bus cycle definition signals M/IO#, D/C#, W/R#, and CACHE#. As may be seen, a special bus cycle is generated on the bus cycles definition lines by the assertion of the values zero on the M/IO# pin (indicating an I/O location), zero on the D/C# pin (indicating not a data cycle), one on the W/R# pin (indicating a write cycle), and one on the CACHE# pin (indicating information is being transferred between external memory and an internal cache). The Pentium® processor address bus joined to the bus unit includes twenty-nine signal lines referred to as A31:A3 which constitute the address bus proper and a byte enable bus which includes eight signal lines referred to as BE7:BE0. The particular special bus cycle being run is determined by the values of the byte enable output signals as is illustrated in FIG. 5. A trace cycle is indicated by the assertion of the BE5# signal and the deassertion of the other byte enable signals.

Figure 6:
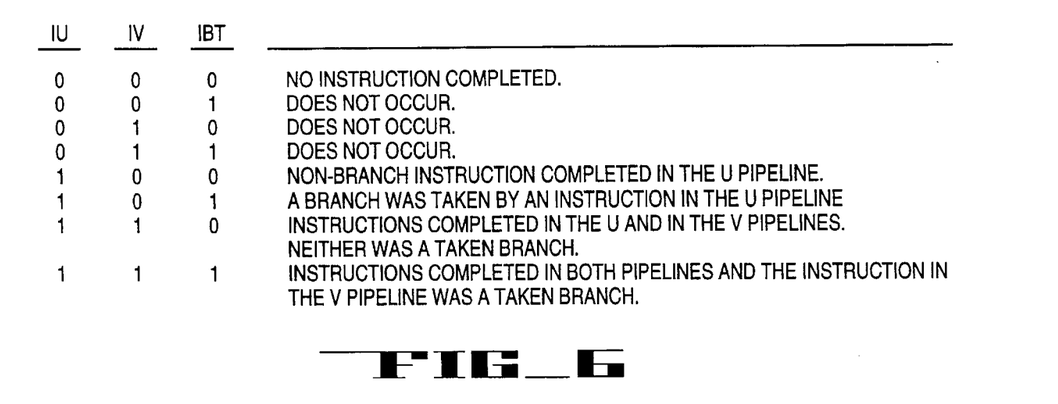
FIG. 6 is a diagram illustrating how signals on certain pins may be interpreted during branch trace cycles in the Pentium® processor.

FIG. 6 illustrates how the output signals on the IU, IV, and IBT pins may be interpreted by a programmer to provide information. As may be seen, the amount of information which can be deciphered from the output signals provided on the IU, IV, and IBT pins is very limited and tedious to attain because of the necessity to count cycles on the IU and IV pins in order to obtain complete information and because of differences in processor core clock and bus clock speeds in processors operating beyond 66 megahertz into the 100 megahertz range. It is extremely difficult and expensive to build an In-Circuit Emulator tool with external pins which are toggling at such high speeds. Moreover, the prior art Pentium® processors require three external pins on the processor, a very large number of pins for the level of information provided. This is especially true where the larger number of pins limits the type socket in which the processor may be utilized and eliminate its use for upgrading many sockets provided in systems which have been previously manufactured.

In order to provide an improved processor which furnishes more information which is more valuable to a programmer the present invention has been devised. In order to implement the invention, two different branch trace cycles are provided by the improved processor. The register TR12 is again utilized to indicate that a branch trace cycle is being run by the setting of the bit 1 of that register. However, bit 8 of the TR12 register is also utilized. If the bit 8 is set to a zero, then a first type of branch trace cycle is being run; while if the bit 8 is set to a one, then a second type of branch trace cycle is enabled. In each of these types of cycles, branch trace messages are generated on the bus for external use. As with the older Pentium processor, the cycle definition signals which provide that a special cycle is to be run and the byte enable signals which define the particular special cycle being run remain the same.

In the first type of branch trace cycle referred to as a normal or slow cycle, the high order bits of the target linear address of the branch are provided on the address lines A31:A04; and the four low order bits of the target linear address are provided on the data lines D63:D60 during a first of two messages. This is followed by a second message during a second cycle in which the same address and data lines carry the linear address of the instruction causing the branch to occur. Thus, the special cycle provides all of the information which is necessary for a programmer to trace the execution of a branch instruction.

In the second type of branch trace cycle referred to as a fast cycle, only one cycle is utilized and a single message is provided. That message is the linear address of the branch target which is provided on the same address and data bits as are used for the slow cycle.

In contrast to the prior art Pentium® processor, the branch trace cycles provided by the present invention eliminate the need for the external pins IU, IV, and IBT; and these pins are therefore eliminated from the improved processor. This helps substantially in the reduction of the number of external pins on the processor. Additionally, while the prior art branch trace system provides the linear address of the branch target on the bus during the special branch trace cycle, it is incumbent on the programmer to determine the actual addresses of instructions causing branches through counting the number of instructions executed using signals on the IU and IV pins. In the present invention, the use of the address bus and the data bus together in the slow mode of these special bus cycles allows the entire linear address of each of the branch target and the instruction causing the taken branch to be provided so that no counting at all is necessary.

This greatly reduces the effort required by a programmer and increases the accuracy of the data the programmer has to use.

Figure 7A:
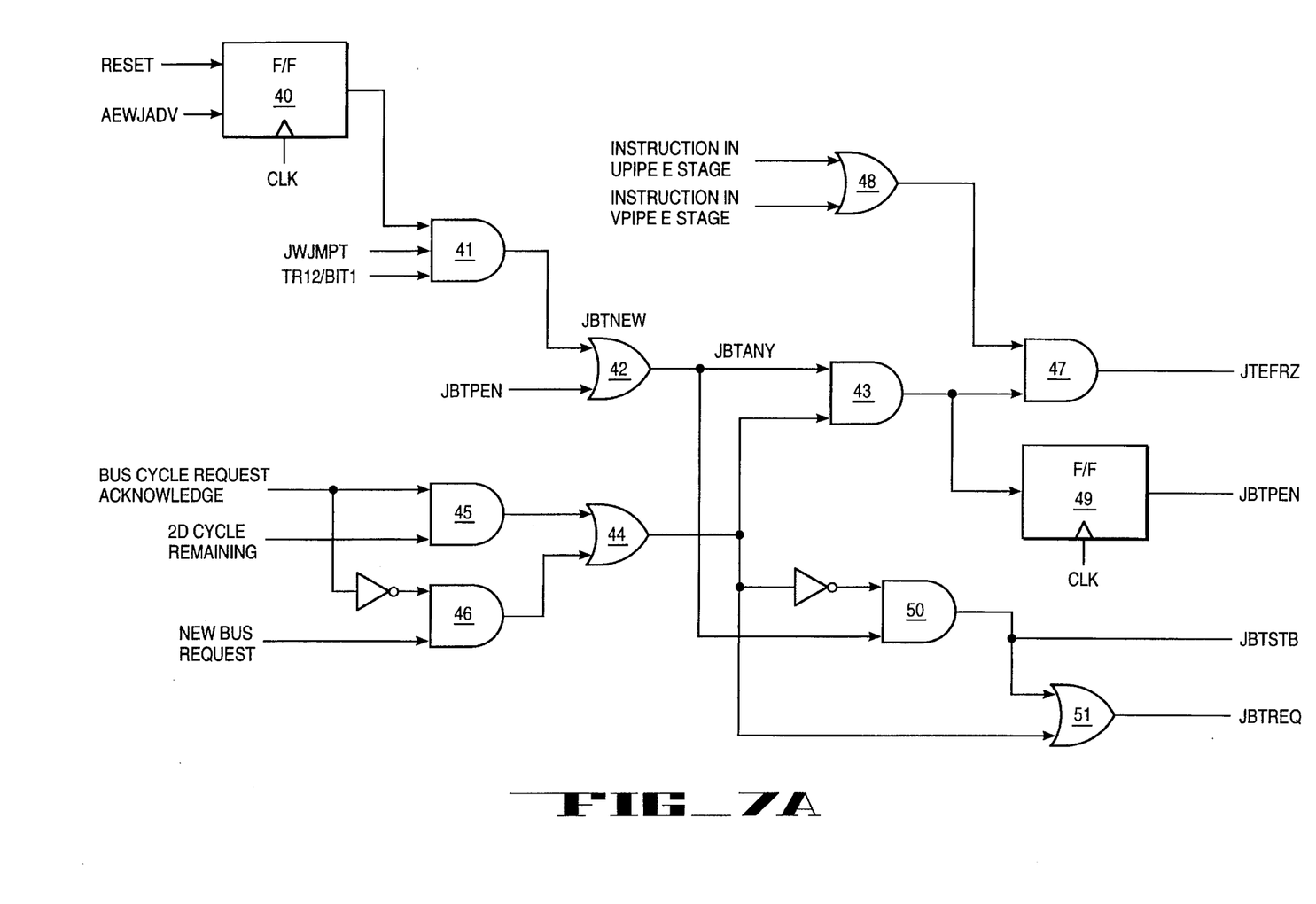
FIGS. 7a, 7b, and 7c form a block diagram illustrating portions of an improved processor designed in accordance with the present invention.
Figure 7B:
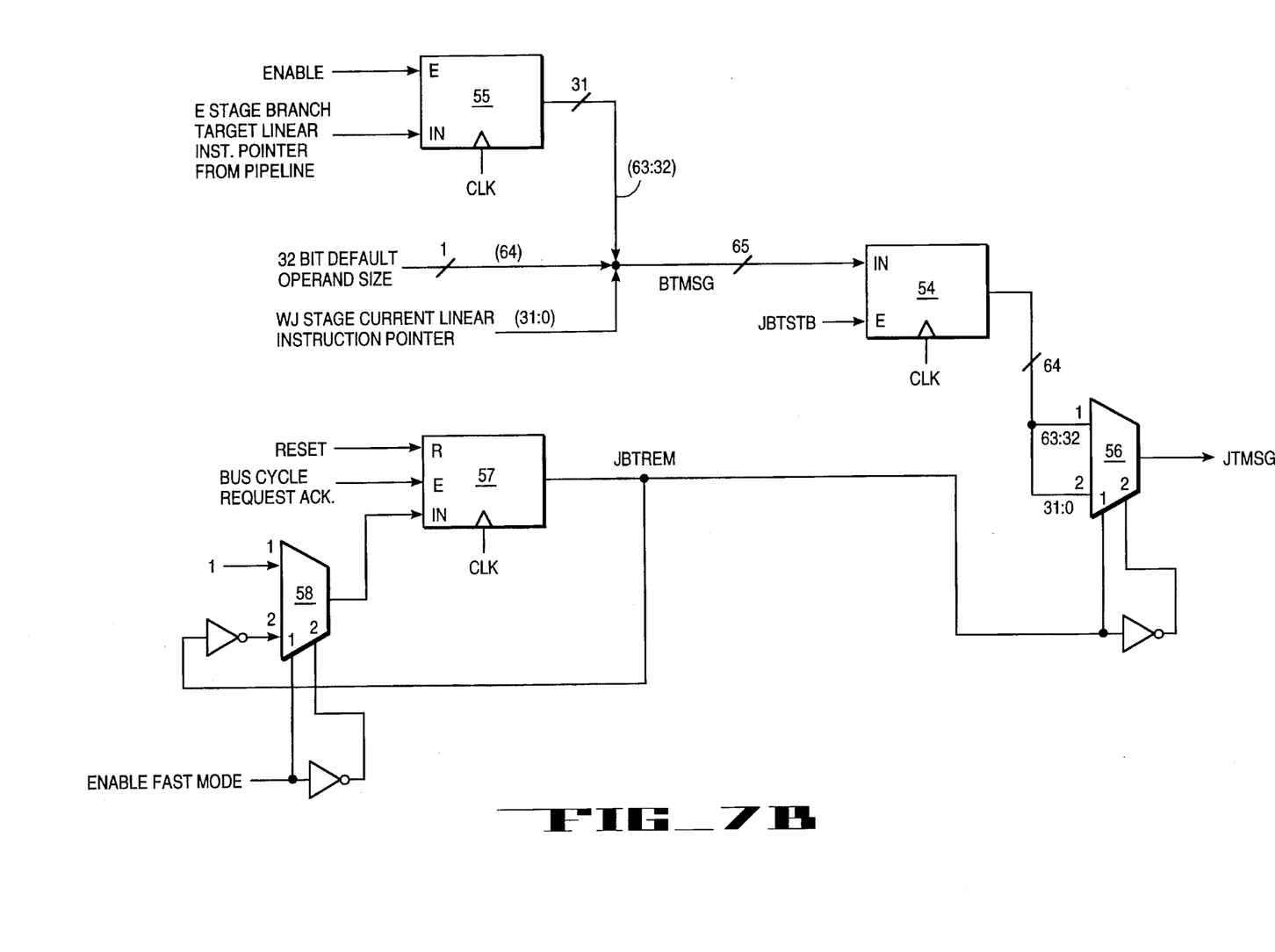
Figure 7E:
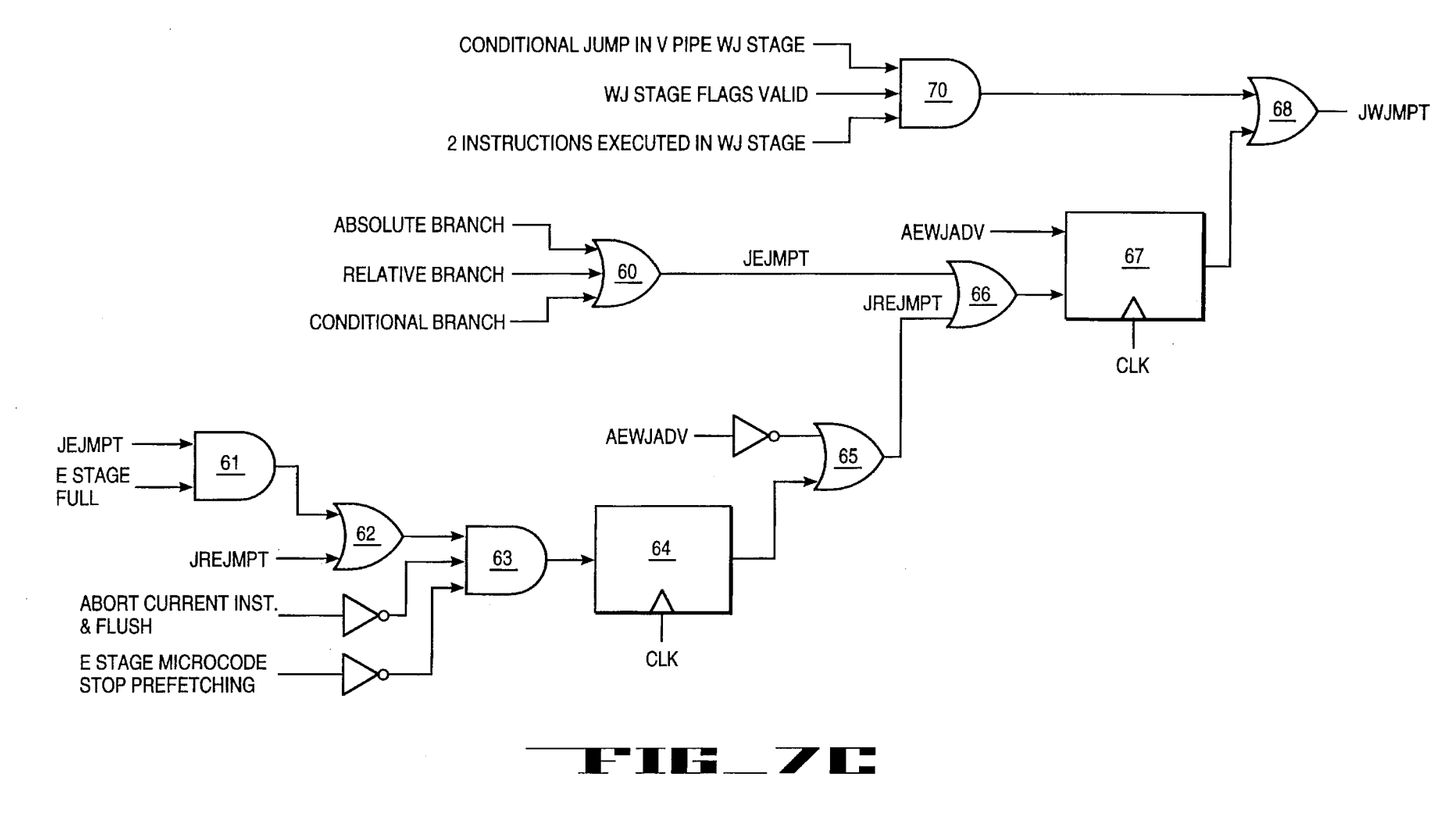

FIGS. 7a, 7b, and 7c together provide a logical block diagram of circuitry utilized in one embodiment of the invention to provide the information described above which may be utilized by a programmer and is especially useful when utilized to provide signals to be used by the In-Circuit Emulator (ICE) circuitry referred to above. In FIG. 7a, a D flip-flop 40 receives an E-to-WJ stage advance signal (AEWJADV), a pipeline control signal which controls the advance of a command from the execution to the write back stage (also referred to as the WJ stage in this specification). The output of the D flip-flop 40 is transferred to one input of an AND gate 41. Also transferred to the AND gate 41 is a JWJMPT signal which indicates that there is a jump command in the write back (WJ) stage of the pipeline. Finally, the condition of the trace bit in the TR12 register is furnished as a third input to the AND gate 41. If the trace bit 1 is set, there is a jump command in the write back stage, and when the advance signal is docked by the processor to the AND gate 41, a signal JBTNEW is produced which indicates that the pipeline is not stalling and a new branch trace message in sitting in the WJ stage which is a valid branch taken.

The output of the AND gate 41 is transferred to the input of an OR gate 42 which also receives a signal indicating when true that there is already a branch trace message pending from a previous cycle which has not yet been placed on the bus. The output of the OR gate 42 is a signal JBTANY which indicates that an old or a new branch trace message is pending in the write back WJ stage. This signal JBTANY is transferred to the input of an AND gate 43. The AND gate 43 also receives a second signal which indicates that a cycle buffer in the bus unit holding data intended for the bus is full. The signal indicating that the cycle buffer is full is generated by an OR gate 44 in response to an output from an AND gate 45 or an output from an AND gate 46. The AND gate 45 provides a signal indicating that there is a bus cycle acknowledge and that a second cycle of a branch trace message is still to be sent. This may occur in the slow mode operation described above in which a first branch trace message includes the branch target linear address and a second branch trace message includes the linear address of the command generating the branch; the second of these messages may have been delayed by a higher priority operation on the bus. The output of the AND gate 46 is generated if a bus acknowledge cycle has not been received and there is a new bus request.

If both the cycle buffer is full and there is a branch trace message in the write back stage of the pipeline, the AND gate 43 provides an output signal. This signal is transferred to an AND gate 47. If the AND gate 47 also receives a true signal from an OR gate 48 indicating that there is an instruction in the execution stage of either the U or the V pipeline, the AND gate 47 provides a signal JTEFRZ which indicates that the pipeline E stage must freeze so that the instruction in the E stage cannot advance to the write back stage. The output of the AND gate 43 is also transferred to a flip-flop 49 to provide an output signal JBTPEN to indicate that there is a branch trace cycle pending in the write back stage.

If on the other hand, the cycle buffer is not full and there is a branch trace message in the write back stage, an AND gate 50 generates a signal JBTSTB which indicates that trace message is to be strobed from the write back stage to the cycle buffer. The strobe signal BTSTB is also sent to the input of an OR gate 51 to generate a trace message request JBTREQ. Similarly, a full cycle buffer causes the generation of the trace message request.

The strobe signal JBTSTB is transferred to provide an enabling signal for a D flip-flop 54 shown in FIG. 7b. The input signal BTMSG to the flip-flop 54 is generated by the concatenation of three signals including two addresses and an operand size indicator. The E stage branch target linear instruction pointer is furnished to a D flip-flop 55 which when enabled provides (after one processor dock) the write back (Wd) stage branch target linear instruction pointer as a thirty-two bit address on its output. This signal is concatenated (as bits 63:32) with a one bit signal indicating the default operand size (as bit 64) and the thirty-two bits of the write back stage current linear instruction pointer (as bits 31:0). The default operand size is indicated as thirty-two or sixteen bits by what ultimately becomes bit A:03 of each special bus tracing message. These addresses are available from the E and WJ stages of the pipeline. The D flip-flop 54 provides the branch trace message when properly strobed by the signal JBTSTB. The message is sent to a multiplexor 56 which transfers the appropriate thirty-two bit message JTMSG determined by the control input signals applied. As may be seen, the upper thirty-two bits are the branch target address while the lower thirty-two bits are the address of the instruction causing the branch operation.

The control signals are furnished at the output of a D flip-flop 57 when the flip-flop 57 is enabled by a bus cycle request acknowledge signal indicating that the trace bus cycle message request has been sent and acknowledged. The flip-flop 57 receives an input signal which is a one if fast execution tracing is enabled. This is provided by the state of bit 8 of the register TR12 and indicates whether only the branch target address is to be provided. If the fast execution tracing is enabled, the 1 input to a multiplexor 58 is enabled and a one value is transferred as an output signal JBTREM from the flip-flop 57. This one value enables the 1 input to the multiplexor 56 causing the bits 63:32 indicating the branch target address to be furnished as the signal JTMSG. On the other hand, if the bit 8 of the TR12 register is a zero, the 2 input to the multiplexor 58 is enabled. The input to the 2 terminal is initially a one since a zero is present at the output of the flip-flop 57. This produces a one value as the signal JBTREM and causes the multiplexor 56 to propagate the bits 63:32 indicating the branch target address as the branch trace message. However, on the next clock, the one value at the output of the flip-flop 57 is inverted and a zero is presented at the 2 terminal of the flip-flop 57. This zero enables the 2 input terminal of the multiplexor 56 and propagates the bits 31:0 indicating the instruction causing the branch to be taken as the branch trace message.

FIG. 7c illustrates the logic for providing the signal JWJMPT. An OR gate 60 receives signals indicating the presence of any of an absolute, relative, or conditional branch at the E stage of the pipeline. This signal JWJMPT is furnished to an OR gate 66 and to an AND gate 61 along with a signal indicating the E stage of the pipeline is full. This output of the AND gate 61 is provided to an AND gate 61. The AND gate 61 also receives a signal indicating that the E stage is full and, if both signals are true, provides a signal to an OR gate 62. The OR gate 62 also receives a signal JREJMPT indicating that an E stage jump has already been taken. If either of these two signals is true, a true output is provided to an AND gate 63. As long as there are not signals indicating a current instruction abort and that the E stage of the microcode has stopped the prefetcher, then a true output is produced by the AND gate 63. This signal is transferred to a latch 64 and furnished to an AND gate 65. The AND gate 65 also receives the pipeline control signal AEWJADV indicating that an advance from the execution (E) to the write back (WJ) stage has not yet occurred. This causes the signal JREJMPT to be generated to indicate that an E stage jump has been taken and is to be remembered.

If either the conditions causing the signal JREJMPT or those causing the signal JEJMPT are true, this indicates that a jump has been taken. An OR gate 66 transfers this indication and provides it as input to a latch 67. The latch 67 is enabled by the signal AEWJADV indicating the instruction advance from the E to the WJ stage of the pipeline. A latch output indication that a jump is being taken is at the WJ stage is furnished to an OR gate 68 to produce the output signal JWJMPT which indicates that a taken jump is in the WJ stage.

The OR gate 68 also receives an input signal from an AND gate 70 indicating that a number of other conditions are all true which indicate that a taken jump is in the WJ stage of the pipeline. These are that there is a conditional jump in the V pipeline WJ stage, that all of the WJ stage flags are indicated to be valid by condition codes, and two instructions which have been executed are in the WJ stage. These are the conditions which indicate a valid jump occurring in the V channel of the processor.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A data processing system having an improved execution trace function, the data processing system comprising a bus coupled to a processor, the processor including an instruction cache; at least one instruction pipeline that provides a path for instructions to be fetched from the instruction cache, decoded, and executed; and a control unit that includes circuitry which interprets the decoded instructions and controls the pipeline, wherein the improvement comprises:

a register that stores data indicating a special bus cycle to be run on the bus, the special bus cycle including a first message which provides a target linear address of a branch, and optionally, a second message which provides a linear address of an instruction that caused the branch;

the register having a first bit that enables/disables the special bus cycle, and a second bit that controls whether the special bus cycle includes only the first message, or both the first and second messages.

2. The improvement of claim 1 wherein the first message precedes the second message.

3. The improvement of claim 1 wherein the bus comprises address and data lines, with both the target linear address and the linear address of the instruction which caused the branch being provided on both the address and data lines.

4. The improvement of claim 3 wherein a lower-order portion and a higher-order portion of bits of the target linear address are respectively provided on the data and address lines during the first message.

5. In a data processing system that includes a processor coupled to a bus, the processor including an instruction cache; at least one instruction pipeline that provides a path for instructions to be fetched from the instruction cache, decoded, and executed; and a control unit which includes circuitry that interprets the decoded instructions and controls the pipeline, a method of execution tracing comprising the steps of:

(a) storing data in a register of the processor which indicates that a special bus cycle is to be run on the bus;

(b) setting a first bit in the register to enable the special bus cycle;

(c) setting a second bit in the register to control whether the special bus cycle only includes a first message, or includes both the first and a second message, wherein the first message provides a target linear address of a branch, and the second message provides a linear address of an instruction that caused the branch;

(d) running the special cycle on the bus.

6. The method according to claim 5 wherein the bus comprises address and data lines, wherein a lower-order portion and a higher-order portion of bits of the target linear address are respectively provided on the address and data lines during the first message.

* * * * *

UNITED STATES PATENT AND TRADEMARK OFFICE
CERTIFICATE OF CORRECTION

PATENT NO.  : 5,574,937
DATED  : November 12, 1996
INVENTOR(S)  : Bikas Narain It is certified that error appears in the above-identified patent and that said Letters Patent is hereby corrected as shown below:

In column 7 at line 21 delete "docked" and insert --clocked--

In column 7 at line 67 delete "BTSTB" and insert --JBTSTB--

In column 8 at line 10 delete "dock" and insert --clock--

In column 8 at line 11 delete "(Wd)" and insert --(WJ)--

Signed and Sealed this

Eleventh Day of March, 1997

*Attest:*

BRUCE LEHMAN

*Attesting Officer*  Commissioner of Patents and Trademarks